United States Patent [19]

Shiell et al.

[11] Patent Number: 6,065,125
[45] Date of Patent: May 16, 2000

[54] SMM POWER MANAGEMENT CIRCUITS, SYSTEMS, AND METHODS

[75] Inventors: Jonathan H. Shiell, Plano; Ian Chen, Houston, both of Tex.

[73] Assignee: Texas Instruments Incorporated, Dallas, Tex.

[21] Appl. No.: 08/741,876

[22] Filed: Oct. 30, 1996

Related U.S. Application Data

[60] Provisional application No. 60/008,171, Oct. 31, 1995.

[51] Int. Cl.⁷ .................................................. G06F 13/14
[52] U.S. Cl. .................. 713/330; 713/300; 713/321; 713/323; 713/324; 710/129; 710/300
[58] Field of Search .............................. 395/750.07, 700, 395/750, 750.06, 750.05, 750.04, 750.01

[56] References Cited

U.S. PATENT DOCUMENTS

| | | | |
|---|---|---|---|
| 5,339,437 | 8/1994 | Yuen ........................................ | 395/700 |
| 5,423,045 | 6/1995 | Kannan et al. ......................... | 395/750 |
| 5,504,907 | 4/1996 | Stewart et al. .......................... | 710/300 |
| 5,511,204 | 4/1996 | Crump et al. ........................... | 395/750 |
| 5,511,205 | 4/1996 | Kannan et al. ......................... | 395/750 |
| 5,560,022 | 9/1996 | Dunstan et al. ........................ | 713/300 |
| 5,600,230 | 2/1997 | Dunstan .................................. | 340/636 |
| 5,666,538 | 9/1997 | NeNicola ............................... | 713/320 |
| 5,781,780 | 7/1998 | Walsh et al. ....................... | 395/750.01 |
| 5,875,312 | 2/1999 | Walsh et al. ............................ | 710/129 |

OTHER PUBLICATIONS

IntelDX4 Processor by Intel Corporation, 1994.

*Primary Examiner*—Ayaz R. Sheikh
*Assistant Examiner*—Eric S. Thlang
*Attorney, Agent, or Firm*—Robert D. Marshall, Jr.; Gerald E. Laws; Richard L. Donaldson

[57] ABSTRACT

Circuits, systems, and methods relating to operating a computer system operable in a system manager mode (24). The method includes various steps. The first step (34) occurs during operation of the computer system (10) at a time other than start-up, and receives user power management data from a user of the computer system. The second step (38) stores the user power management data in memory space (30) accessible by the system management mode. The third step (40) accesses the user power management data from the memory space. Finally, the fourth step (42) controls at least one peripheral (14, 16, 18, 20) of the computer system in response to the accessed user power management data.

6 Claims, 1 Drawing Sheet

SMM POWER MANAGEMENT CIRCUITS, SYSTEMS, AND METHODS

This invention claims the benefit of Provisional Application No. 60/008,171, filed Oct. 31, 1995.

This invention relates to power management in computers, and is more particularly directed to SMM power management circuits, systems, and methods.

BACKGROUND OF THE INVENTION

The embodiments described below involve the field of power management in computer systems. As computer systems advance in development, various techniques are evolving to produce more power efficient machines. For example, in the instance of portable computers, such as laptops and notebook computers, it is desirable to improve power efficiency so that the rechargeable power supply lasts a greater amount of time between recharge periods. Therefore, various techniques have arisen to reduce power consumption in these types of computers, particularly during periods of reduced activity or non-use, such as when the user has not operated the keyboard for a particular amount of time. Power consumption techniques also arise in the context of desktop computers. For example, many users prefer to leave their computers turned on during lengthy periods of non-use, and even overnight for purposes of serving other computers, convenience, receiving facsimile transmissions, or simply to avoid a lengthy boot-up procedure upon returning to the computer the next day. During these periods of non-use, therefore, power reduction is also beneficial. Lastly, the combination of portable computers and desktop computers in so-called docking bay configurations also benefit from power adjustments, particularly in instances where the portable computer is removed from the dock, thereby changing the power consumption considerations. These varying configurations each may benefit from improved power performance.

In certain X86 processors, the processor operates in a system management mode ("SMM") which commonly communicates with a separate chipset to control the level of power consumption during periods of reduced activity. Typically, the SMM routine first reads an area of memory space often referred to as the configuration memory, such as the standard CMOS memory which is supported by battery back-up in most personal computers. From this configuration memory, the SMM routine gathers timeout values and other power-related information. The SMM routine then stores this information into a memory area which at boot-up is accessible to the operating system; however, thereafter the SMM routine then makes this area inaccessible to the operating system, typically by setting bits in either microprocessor and/or chipset registers. Thus, thereafter under normal operations (i.e., those after this transient start-up procedure), this memory area is inaccessible to the operating system. The SMM routine also writes certain power information to the separate chipset, such as by writing timeout values to timers in the chipset. The separate chipset in turn monitors various computer peripherals and, upon detecting a peripheral which has been idle beyond its corresponding timeout period, activates an SMM routine by asserting the SMI (system management interrupt) signal. In response, the system enters SMM which powers off the peripheral at issue, until an attempt is later made to access the particular peripheral. Once the new access attempt is made, the SMM routine restores full normal operating power to the peripheral. Note further that these operations for powering off and restoring power to peripherals are well understood in the art.

While the prior art SMM strategy reduces power consumption, it suffers significant drawbacks. One such drawback is that the timeout values are stored in an area of memory space which is inaccessible to the computer user through the operating system. As a result, the timeout values are often wholly inaccessible to the user and, therefore, are not subject to change despite potential desires or needs of the user. In other instances, a sophisticated user may know to access these values by having to re-boot his or her system, and then change the values at the BIOS stage of operation rather than using the operating system. However, even for those users who know of this technique, this operation is both inconvenient and inefficient, and may be impractical if the need to change the timeout values arises at a time when boot-up is not possible.

Under the recently produced Windows 95 operating system, certain system timeout values may be input by the user. However, these values are implemented using the operating system and, therefore, this process is not backward compatible. In other words, a user desiring this capability must upgrade the user's operating system and possibly also the user's hardware. Thus, this alternative approach has no applicability to systems which do not use the particular operating system, and this approach cannot be added onto earlier operating systems without completely replacing the prior operating system.

In view of the above, there arises a need to address the drawbacks of the prior art by providing improved power management circuits, systems, and methods.

SUMMARY OF THE INVENTION

One inventive embodiment set forth includes a method of operating a computer system operable in a system manager mode. The method includes various steps. The first step occurs during operation of the computer system at a time other than start-up, and receives user power management data from a user of the computer system. The second step stores the user power management data in memory space accessible by the system management mode. The third step accesses the user power management data from the memory space. Finally, the fourth step controls at least one peripheral of the computer system in response to the accessed user power management data.

Other circuits, systems, and methods are also disclosed and claimed.

DETAILED DESCRIPTION OF THE PREFERRED EMBODIMENTS

Figure 1:
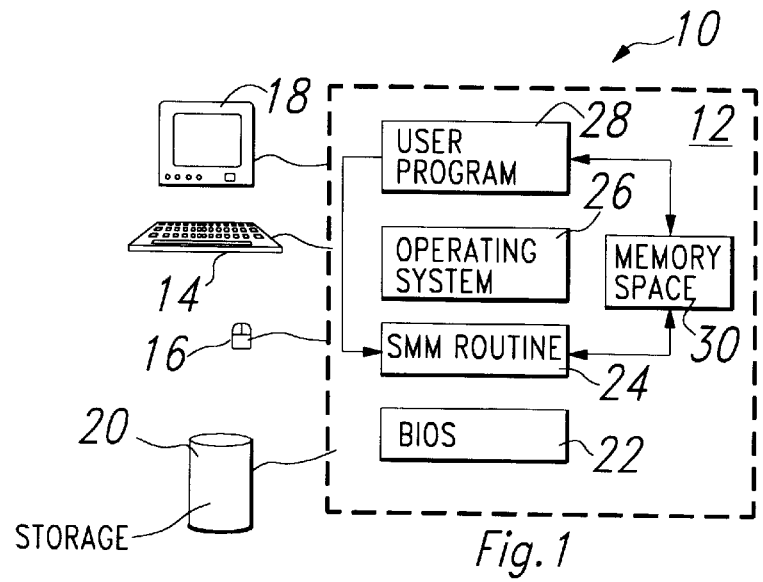
FIG. 1 illustrates a diagrammatic depiction of a computer system for receiving user power management data.

FIG. 1 illustrates a diagrammatic depiction of a computer system designated generally at 10. System 10 includes a computer 12, which includes various blocks described below. Note also that numerous other blocks and interconnections could be included within computer 12, but for purposes of this embodiment are not shown to simplify the discussion. Continuing, therefore, computer 12 receives user input from various sources, such as a keyboard 14 and a mouse 16 or other pointing device. Clearly, other input devices and sources are known in the art for communicating user data to computer 12. Computer 12 outputs information to a display 18 to communicate that information to the user and, while not shown, the information could be further output to a printer or alternative mechanism for providing meaningful information to the user. Lastly, computer 12 communicates with a storage device 20, which may be either internal or external storage and comprise any type of media such as a floppy disk drive, a hard disk drive, an optical read/write device, or other such device.

Within computer 12, there is shown four blocks evenly numbered 22 through 28 demonstrating a hierarchy of operation. At the lowest level is the computer BIOS 22, followed by the system management mode (SMM) routine 24, the operating system 26, and the user program or programs 28. Lastly, computer 12 includes an SMM memory space 30. For purposes of explaining the present embodiment, SMM memory space 30 is shown only to communicate with SMM routine 24 and user program 28. With respect to the communication between SMM routine 24 and memory space 30, this designation depicts that SMM routine 24 has access to space 30 while operating system 26 does not. For example, memory space 30 may be protected under known techniques so as to normally prohibit access by operating system 26 to locations within that space. Note also that this particular space may not necessarily be an isolated or separate hardware structure, but instead is preferably a group of designated memory locations where the group is part of a larger memory which contains other locations which are accessible by other components, such as operating system 26. Further, this larger memory may be external to the system microprocessor or may be included within the microprocessor. Importantly, with respect to the communication between user program 28 and memory space 30, and as detailed below, this interaction permits direct communication of information to memory space 30 so that SMM routine 24 may thereafter respond to the user data rather than the default data previously stored in memory space 30. The particular benefits of this level of communication are further appreciated below.

Figure 2:
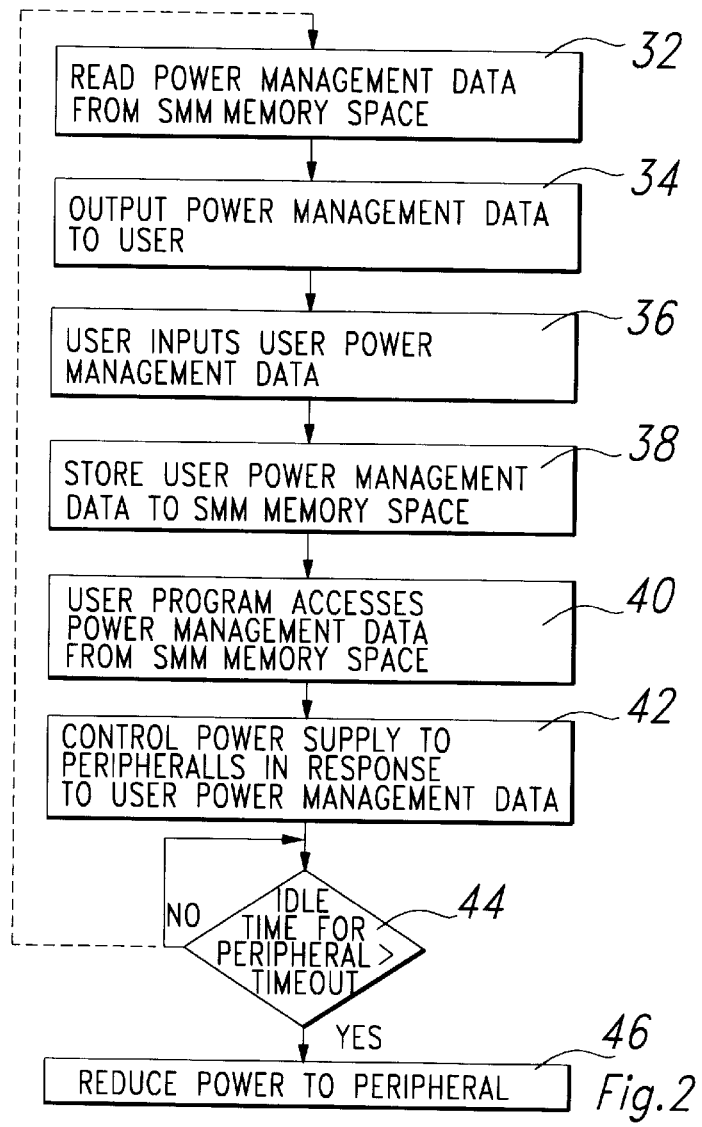
FIG. 2 illustrates a flowchart for receiving user power management data and controlling computer system peripherals in response to that data.

FIG. 2 illustrates a flowchart of the method embodiment which further may be appreciated given the embodiment of FIG. 1. The method begins with step 32, where user program 28 commences by being run by the user in any of known fashions. Having commenced the program, step 28 reads the data in memory space 30 which bear on the power management of the peripherals of computer system 10. Preferably, certain initial values are written from BIOS 22 to memory space 30 by default and, therefore, it is these values which are read by step 30. With respect to the particular data, one preferred such value is a timeout value for each of the peripherals of computer system 10; these values inform SMM routine 24 how long a given peripheral should remain idle before the power to that particular peripheral is reduced or eliminated. For example, timeout data for display device 18 may be on the order of 15 minutes, so that SMM routine 24 can reduce or eliminate power to display device 18 if it is idle by not changing the image it portrays for a 15 minute period. As another example, timeout data for storage device 20 may be on the order of seconds (e.g., two seconds), so that SMM routine 24 can reduce or eliminate power to storage device 20 if it is idle by not being addressed for a two second period. Other power management data may arise in the instance of a portable computer which docks into the desktop system shown in FIG. 1. For example, the status of whether or not the portable computer is docked into the desktop system may establish information in memory space 30, and such data also are read during step 32. Still other data relating to power management will be known or become apparent to one skilled in the art, and also may be read by step 32. In all events, after this information is read, user program 28 performs step 34 to output the data to the user, typically by displaying it on display device 18, or optionally by communicating it to some other source such as a printer (not shown).

Having received access to the default power management data, the user in step 36 inputs new power management data to user program 28. Again, this data can relate to the examples set forth above, or others contemplated by a person skilled in the art. Note at this point that the user is able to input this information without having to re-boot the overall system. In other words, the user is able to input this information at a time other than start-up of the computer. Thus, the user is free to input the information at any time he or she can run program 28, thereby creating the advantage of improved operability and efficiency over the prior art described above. Next, in step 38, user program 28 stores the user power management data from step 36 directly to memory space 30. Preferably, the new data are written to the locations of the earlier-existing default values, thereby overwriting the older or default data. As an alternative, the user power management data is written to other locations within memory space 30 and whatever identifier, such as an address pointer, is changed to indicate to SMM routine 24 that the default data should now be disregarded in favor of the user power management data. Note at this point that operating system 26 is not a required intermediary for this action. Consequently, there is the advantage of backward compatibility, that is, the present embodiment may be used with systems wherein the operating system is incapable of, or generally prohibited from, writing to memory space 30, while still deriving the additional functionality and advantages set forth herein.

In step 40, SMM routine 24 accesses the newly revised power management information from memory space 30. This step may occur by having an earlier step, such as step 36 or step 38, set a flag which is periodically checked by SMM routine 24 to determine whether or not the power management data has been updated in memory space 30. Given the new information, SMM routine 24 operates to ensure that this user-provided data is used to control the power supply to the corresponding peripherals of computer system 12. This control operation is shown in step 42, where the user-provided power management data is used to control power to each corresponding peripheral of the computer system 12. Note that this step may occur in various manners. For example, SMM routine 24 may communicate this information to a separate chipset, having appropriate timers and comparators. The operation of the chipset is shown in steps 44 and 46. In step 44, the chipset monitors the time during which a particular peripheral is idle, and compares that time to the timeout data provided by the user to memory space 30. If the idle time exceeds the user-provided timeout data, step 46 reduces power to the particular peripheral. For example, in one embodiment, the chipset would perform step 46 by signaling the exceeded timeout period to SMM routine 24, such as with an interrupt signal. Thereafter, SMM routine 24 eliminates the power to the particular peripheral, or reduces it to a level below that which is typically required for normal operation of the particular peripheral. Of course, the particular amount of reduction depends on the specific peripheral at issue, as does the amount of power for its normal operation. Once the peripheral is thereafter again required for operations, SMM routine 24 returns the power level to the peripheral back to the appropriate standard operating level. Note as an alternative to the use of a separate chipset, SMM routine 24 may maintain the user-information within the microprocessor itself, without the added level of complexity of a separate monitoring chipset. The remaining control would operate in the manner described above with respect to the chipset.

Note also that a dashed line is shown further connecting step 44 to the beginning of the flow of FIG. 2 and, thus, to step 32. This designation illustrates that, at any time, the user of computer system 10 may once again initiate the flow by cooperating with program 28. In this instance, the most recent power management data input by the user will become the controlling data for the flow of FIG. 2. Further, the user may choose in this instance to only update certain values, in which instance the older and unaltered values for other power management will continue to control for those corresponding peripherals. Again, therefore, user program 28 may operate repeatedly to change power management, without having to re-boot computer system 10.

Having described the above method and apparatus, note in the preferred embodiment the peripherals of most import are those which consume the greatest amounts of power. Thus, particular attention is directed to display device 18 and storage device 20, but of course the embodiments may apply to other peripherals. Note further that the power management data could include other aspects relating to the consumption or supply of power. Returning, therefore, to the docking bay scenario mentioned above, the power management data could be used to disable power to a peripheral which is no longer connected. For example, when the portable computer is removed from its dock, the separate display of the desktop station need not receive power or in any way drain the power of the now-removed portable system. Thus, the user could invoke program 28 at this instance to inform the flow of FIG. 2. Alternatively, this data, caused by the action of the user removing the portable computer (or inserting it in an alternative example), could be automatically ascertained by program 28 upon detection of either connection, or removal, between the docking components. Thereafter, program 28 would communicate the new data to memory space 30 as described above.

Given the circuits, methods, and systems, above, one skilled in the art could create a series of instructions to perform the operations of program 28, as well as the interactive activities set forth above. For example, in one contemplated embodiment, user program 28 could take advantage in a new manner of certain instructions currently available in some x86 microprocessors. Specifically, the Intel instruction set has in the past included an instruction which was used for in-circuit emulation (ICE) to access non-SMM memory while operating in the mode of SMM. These specialized instructions are known to have been executed by a program during SMM and while such an instruction was executed, it actually toggled the microprocessor to temporarily (i.e., during execution of the particular instruction) switch from SMM operation to non-SMM operation in order to permit access to the non-SMM memory space. In other words, if an access to memory were made during SMM and without this specialized instruction, then the access would simply be to a protected memory space such as memory space 30. However, during emulation, it is sometimes desirable to have access to non-SMM memory space while otherwise running an SMM routine. These specialized instructions, therefore, permitted this functionality.

In one embodiment of this invention, therefore, it is proposed that the above-described particularized instructions be included within user program 28 but to operate in a completely opposite manner. Particularly, at a time other than start-up, the microprocessor will not be in SMM. However, the above-discussed specialized instructions could be asserted by user program 28 and would, during execution of that instruction, toggle the SMM status of the microprocessor. In this embodiment, however, the toggle would be from non-SMM to SMM, as opposed to the activity described above which was from SMM to non-SMM. Thus, in the example of this embodiment, assertion of the specialized instruction would switch the microprocessor from non-SMM mode to SMM mode for purposes of executing that specialized instruction. During this interim of brief SMM operation, therefore, the instruction has access to memory space 30 and, therefore, can access the power management data described above. Consequently, one skilled in the art will appreciate that such access may be used in combination with the remaining steps described above to accomplish the functionality of the embodiments described herein.

In addition to the implementation above, a person skilled in the art may look to various other resources for myriad examples leading to a diverse span of implementations. Indeed, this flexibility is yet another of the advantages that may be appreciated over the prior art. As another example of the inventive benefits, the embodiments above may improve both portable and desktop computer systems, and further may apply to the docking situation where portable and desktop computers come together. In addition, various examples above show flexibility in the various types of power management data and peripherals at issue. Consequently, while the present invention has been described in detail, various substitutions, modifications or alterations could be made to the descriptions set forth above without departing from the invention which is defined by the following claims.

What is claimed is:

1. A method of operating a computer system operable in a system management mode, wherein the computer system comprises a microprocessor, the method comprising the steps of:

first, during operation of the computer system at a time other than start-up or restart, receiving user power management data from a user of the computer system;

second, storing the user power management data in memory space accessible by the system management mode;

third, accessing the user power management data from the memory space, and wherein said accessing step comprises accessing the user power management data from the memory space by an integrated circuit separate from the microprocessor; and fourth, controlling at least one peripheral of the computer system in response to the accessed user power management data.

2. A method of operating a computer system operable in a system management mode, the method comprising the steps of:

first, during operation of the computer system at a time other than start-up or restart, receiving user power management data from a user of the computer system;

second, storing the user power management data in memory space accessible by the system management mode;

third, accessing the user power management data from the memory space;

fourth, controlling at least one peripheral of the computer system in response to the accessed user power management data; and wherein the system management mode comprises default user power management data stored in the memory space, and prior to said receiving step the steps of:

reading the default user power management data stored in the memory space; and displaying the default user power management data stored in the memory space to the user.

3. A method of operating a computer system operable in a system management mode and comprising an operating system, the method comprising the steps of:

first, during operation of the computer system at a time other than start-up or restart, receiving user power management data from a user of the computer system;

second, storing the user power management data in memory space accessible by the system management mode, wherein said storing step comprises:
  first, operating the computer system during a mode other than the system management mode;
  second, issuing an instruction; and
  third, executing the instruction, said executing step comprising:
    first, temporarily toggling the computer system from the mode other than the system management mode to the system management mode;
    second, storing the user power management data in memory space accessible by the system management mode; and
    third, returning the computer system from system management mode to the mode other than the system management;

third, accessing the user power management data from the memory space; and fourth, controlling at least one peripheral of the computer system in response to the accessed user power management data such that power consumption by the at least one peripheral is reduced, wherein the user power management data comprises timing data and the at least one peripheral requires a predetermined amount of power under normal operating conditions, and wherein the controlling step comprises:
  counting a period of time during which the at least one peripheral is idle; and
  reducing the amount of power coupled to the at least one peripheral below the predetermined amount of power after the period of time exceeds the timing data.

4. The method of claim 3 wherein said accessing step comprises:

first, operating the computer system during a mode other than the system management mode;

second, issuing an instruction; and third, executing the instruction, said executing step comprising:
  first, temporarily toggling the computer system from the mode other than the system management mode to the system management mode;
  second, accessing the user power management data from the memory space; and
  third, returning the computer system from system management mode to the mode other than the system management.

5. A computer system operable in a system management mode, comprising:

a computer-readable memory comprising a memory space accessible by the system management mode;

at least one peripheral device;

a computer programmed to perform a sequence of steps comprising:
  first, during operation of the computer system at a time other than start-up or restart, receiving user power management data from a user of the computer system;
  second, storing the user power management data in the memory space;
  third, accessing the user power management data from the memory space;
  fourth, controlling the at least one peripheral of the computer system in response to the accessed user power management data; and
  wherein the system management mode comprises default user power management data stored in the memory space, and prior to said receiving step, the sequence of steps further comprise:
    reading the default user power management data stored in the memory space; and
    displaying the default user power management data stored in the memory space to the user.

6. A computer-readable memory configured so that, when read and used by a computer system, the computer system is directed by a plurality of operations comprising:

first, during operation of the computer system at a time other than start-up or restart, receiving user power management data from a user of the computer system;

second, storing the user power management data in a memory space of the computer-readable memory, the memory space accessible by the system management mode;

third, accessing the user power management data from the memory space;

fourth, controlling at least one peripheral coupled to the computer system in response to the accessed user power management data; and wherein the system management mode comprises default user power management data stored in the memory space, and prior to said receiving operation, the plurality of operations further comprise:
  reading the default user power management data stored in the memory space; and
  displaying the default user power management data stored in the memory space to the user.

* * * * *